No. 688,519.  
B. HICKS.  
MACHINE FOR STEMMING AND CLEANING PEANUTS OR GREEN PEAS.  
(Application filed Nov. 1, 1900.)  
(No Model.)  
Patented Dec. 10, 1901.  
2 Sheets—Sheet 1.

Witnesses  
Benjamin Hicks, Inventor.  
BY  
Attorneys

No. 688,519.  
B. HICKS.  
MACHINE FOR STEMMING AND CLEANING PEANUTS OR GREEN PEAS.  
(Application filed Nov. 1, 1900.)  
(No Model.)
Patented Dec. 10, 1901.
2 Sheets—Sheet 2.
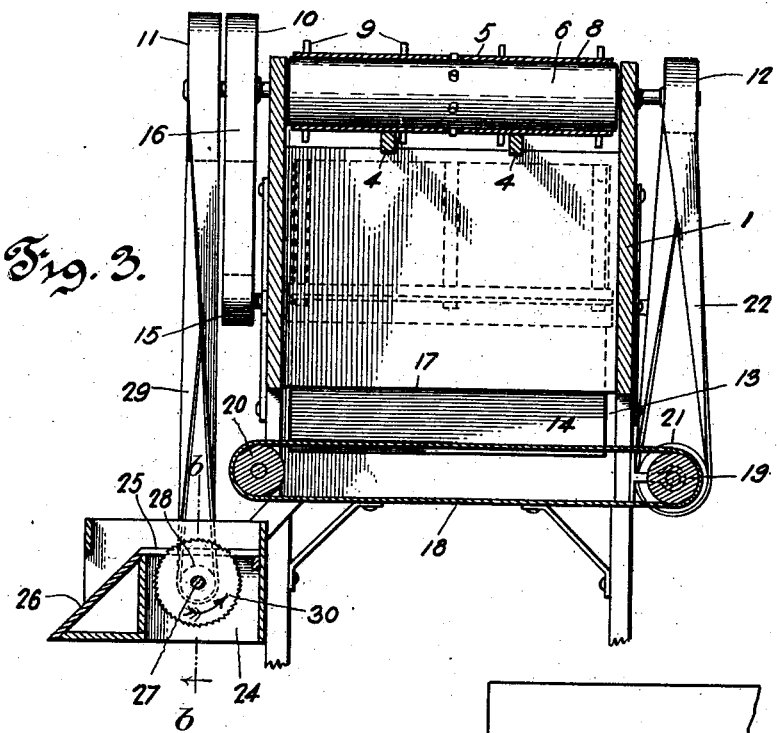
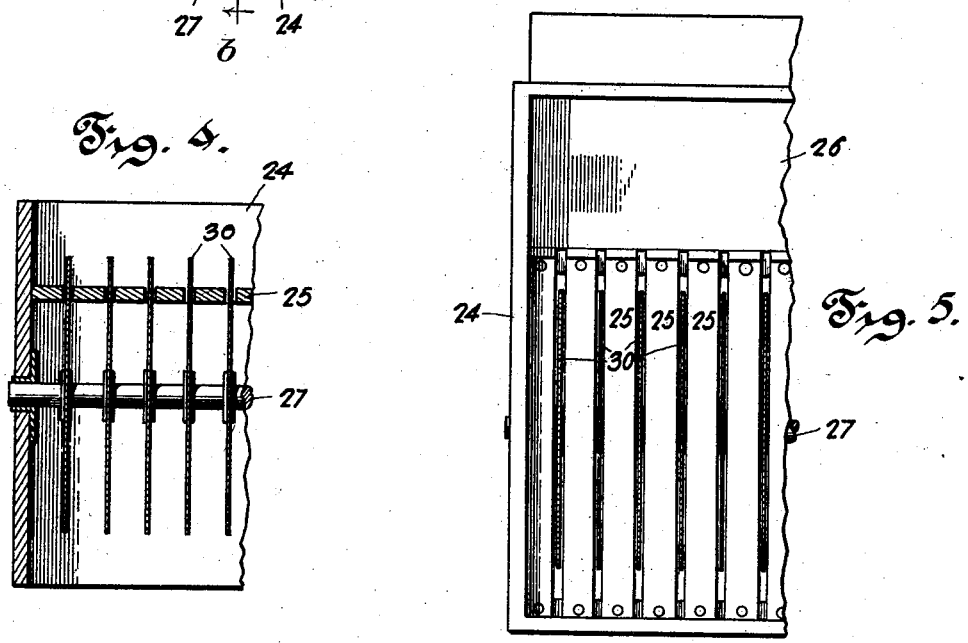
Witnesses  
Benjamin Hicks, Inventor.  
By C. A. Snow & Co.  
Attorneys

UNITED STATES PATENT OFFICE.

BENJAMIN HICKS, OF VICKSVILLE, VIRGINIA.

MACHINE FOR STEMMING AND CLEANING PEANUTS OR GREEN PEAS.

SPECIFICATION forming part of Letters Patent No. 688,519, dated December 10, 1901.

Application filed November 1, 1900. Serial No. 35,174. (No model.)

*To all whom it may concern:*

Be it known that I, BENJAMIN HICKS, a citizen of the United States, residing at Vicksville, in the county of Southampton and State of Virginia, have invented a new and useful Machine for Stemming and Cleaning Peanuts or Green Peas, of which the following is a specification.

My invention is an improved machine for stemming and cleaning peanuts and green peas; and it consists in the peculiar construction and combination of devices hereinafter fully set forth, and pointed out in the claims.

The object of my invention is to provide a cheap, simple, and easily-operated machine which is efficient in cleaning peanuts and green peas, stemming the same, and putting them in the best condition for the market.

Figure 1:
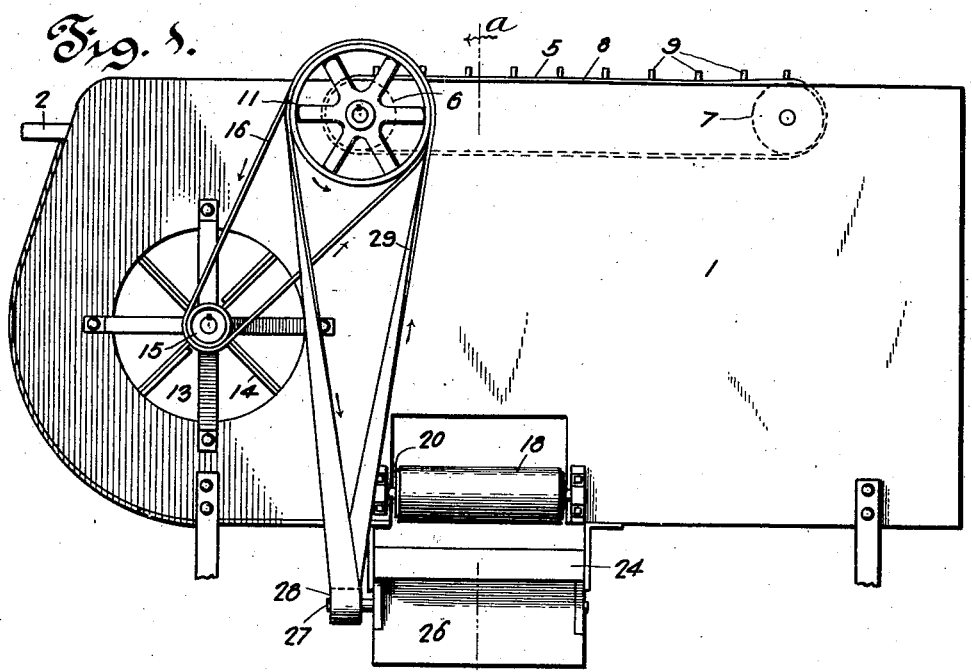
Figure 2:
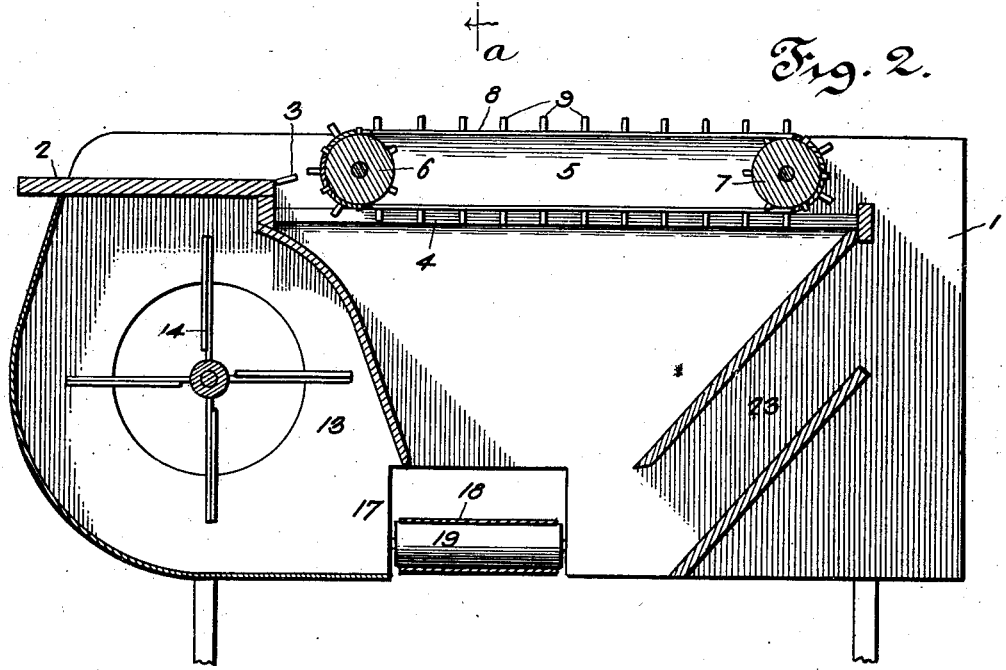

In the accompanying drawings, Figure 1 is a side elevation of a cleaning and stemming machine constructed in accordance with my invention. Fig. 2 is a vertical longitudinal sectional view of the same. Fig. 3 is a transverse sectional view of the same, taken on a plane indicated by the line $a\ a$ of Fig. 1. Fig. 4 is a detail sectional view of the stemming-trough, taken on a plane indicated by the line $b\ b$ of Fig. 3 and showing a section of the shaft and a number of the stemming-saws mounted thereon. Fig. 5 is a detail top plan view of a portion of the stemming-trough, showing certain of the stemming-saws therein.

In the embodiment of my invention I provide an inclosing casing 1, which is of any suitable size and shape and is preferably of the shape here shown. At one end of the casing 1 on the upper side thereof is a feed-table 2, at the inner side of which are a series of teeth 3, which are spaced a suitable distance apart. The upper side of the casing 1, extending from the feed-table, is open, and in the same are disposed a series of longitudinal slats 4, which are spaced a suitable regular distance apart. Above the said slats 4 is disposed an endless traveling feed-rake 5, which comprises a pair of rollers 6 7 and an endless apron 8, which connects the said rollers and is provided with rake-teeth 9, that project from its outer side. The said feed-rake, slats 4, and teeth 3 of the feed-table coact. The rollers 6 7 have their shafts journaled in bearings in the sides of the casing 1. The shaft of the roller 6 is provided at one end with a pair of pulleys 10 11 and is provided at the opposite end with a pulley 12. A fan-casing 13 is formed below the feed-table 2, and in the said fan-casing is a revoluble fan or blower 14, the shaft of which is provided with a pulley 15, which is connected to the pulley 10 by an endless belt 16. Opposite discharge-openings 17 of the fan-casing is an endless conveyer-apron 18, which is disposed transversely in the casing 1, in the lower side thereof, and is supported by a pair of rollers 19 20, the shafts of which are journaled in bearings on opposite sides of the casing 1. The shaft of roller 19 has a pulley 21, which is connected to the pulley 12 by an endless belt 22. The said endless conveyer-apron 18 operates in the direction indicated by the arrow in Fig. 3, and the same is located under the endless traveling feed-rake, as shown.

In the casing 1, at the end opposite the fan or blower 14, is an inclined flue 23, the intake of which is on the side of conveyer-apron opposite the discharge-opening 17 of the fan or blower casing. The upper inclined side of the said flue 23 and the inner side of the fan-casing are adapted to cause the peas and peanuts to pass between the feed-table and the feed-rake and fall upon the conveyer-apron 18, as will be understood. Said conveyer-apron discharges onto a trough 24 of suitable length and width, which is disposed longitudinally on one side of the casing 1. In the said trough is a slatted false bottom 25, at the outer side of which is a discharge-board 26, which forms a descending inclined plane. A shaft 27 is disposed longitudinally in the said trough below the slats 25 and has its bearings in the ends of said trough. On one end of the said shaft is a pulley 28, which is connected to the pulley 11 by an endless belt 29. The lower side of the trough below the slats 25 is open. A series of stemming-saws 30 are secured on the shaft 27 and rotated thereby, and the upper sides of said stemming-saws operate in the spaces between the slats 25. The said stemming-saws are appropriately spaced apart and their teeth are exceedingly fine, the said saws being similar to the saws used in cotton-gins.

The operation of my improved cleaning and stemming machine is as follows: Peanuts as dug and when sufficiently dried or green peas in the pod as when gathered are fed to the machine from the feed-table 2. The feed-rake, slats 4 thereunder, and the teeth 3 at the inner end of the feed-table coact on the peas or peanut-vines to dislodge leaves from the pea-pods and to break the rootlets from the peanuts, and as the peas or peanuts fall from between the slats 4 onto the conveyer-apron 18 they are winnowed by the blast of air from the fan or blower, which is delivered transversely of the conveyer 18, the said blast carrying away the loose leaves and other trash from the peas and the rootlets from the peanuts through the flue 23. The pea-pods and peanuts being heavier are not carried off by the winnowing-blast, but remain on the conveyer-apron and are dropped therefrom onto the stemming-trough 24, in which they are acted upon by the rapidly-revolving stemming-saws 30. The latter act upon the peas and peanuts in such manner as to dispose the pods and the peanuts longitudinally on the slatted bottom of the trough and transversely with relation to the slats 25, so that the stems at the ends of the peanuts and pea-pods are presented to the action of the saws, which cut them away and serve to draw the stems downward through the spaces between the slats 25 and to work the stemmed pea-pods and peanuts transversely on the slatted bottom of the trough to the inclined discharge-board 26, down which they roll and are discharged from the machine. Owing to the fineness of the saw-teeth and the lightness in weight of the peanuts and pea-pods the peanuts and pea-pods are not cut through or in any wise injured by the saws, and the latter are effective only for the purpose of stemming pea-pods and peanuts and in feeding the same from the stemming-trough, as hereinbefore described.

Having thus described my invention, I claim—

1. In a machine of the class described, a stemming-trough, a bottom therein, comprising a series of horizontal transversely-disposed slats, said trough having a wall on one side of said slatted bottom, and the opposite side of said slatted bottom being unobstructed, a longitudinal shaft journaled in said trough, disposed under said slatted bottom and a series of stemming-saws on and revolved by said shaft, said stemming-saws operating in the spaces between said slats, and the upper sides thereof moving toward the unobstructed side of said slatted bottom, whereby the rotation of said saws is effective in stemming the peanuts and green peas and in discharging the stemmed peanuts or peas from said slatted bottom, substantially as described.

2. In a machine for cleaning and stemming peanuts, and green peas, the combination of a casing having a feed-table, and a series of slats extending from the inner end or side of said feed-table, the latter having teeth at its inner side above said slats, an endless traveling feed-rake above and coacting with said slats and toothed feed-table, a carrier disposed transversely of the casing below the said slats and onto which the peas and peanuts are fed, means to create and discharge a blast of air transversely of the carrier, for the purpose set forth, a stemming-trough onto which said carrier discharges, said stemming-trough having a series of transversely-disposed slats and a series of revoluble stemming-saws, the latter operating in the spaces between said slats, substantially as described.

In testimony that I claim the foregoing as my own I have hereto affixed my signature in the presence of two witnesses.

BENJAMIN HICKS.

Witnesses:
C. J. EDWARDS,
C. C. VAUGHAN.